United States Patent [19]

Houghton et al.

[11] Patent Number: 5,433,069

[45] Date of Patent: Jul. 18, 1995

[54] PROCESS AND ECONOMIC USE OF EXCESS COMPRESSED AIR WHEN FIRING LOW BTU GAS IN A COMBUSTION GAS TURBINE

[75] Inventors: James Houghton, Newport Beach; Dieter G. Lamprecht, Huntington Beach, both of Calif.

[73] Assignee: Fluor Corporation, Irvine, Calif.

[21] Appl. No.: 143,991

[22] Filed: Oct. 27, 1993

Related U.S. Application Data

[63] Continuation of Ser. No. 801,535, Dec. 2, 1991, abandoned.

[51] Int. Cl.6 ............................... F02G 3/00
[52] U.S. Cl. .................... 60/39.02; 60/39.15; 60/269
[58] Field of Search ........... 60/39.02, 39.15, 39.465, 60/269

[56] References Cited

U.S. PATENT DOCUMENTS

| | | | |
|---|---|---|---|
| 2,500,925 | 3/1950 | Bonvillian | 60/39.15 |
| 2,547,660 | 4/1951 | Prince | 60/39.15 |
| 2,619,796 | 12/1952 | Sterland | 60/39.15 |
| 2,655,788 | 10/1953 | Sedille | 60/39.15 |
| 2,677,932 | 5/1954 | Forsling | 60/39.15 |
| 2,750,738 | 6/1956 | Barrett et al. | 60/39.15 |
| 3,749,047 | 7/1973 | Tamaru et al. | 60/39.15 |
| 3,868,818 | 3/1975 | Itoh | 60/39.15 |

FOREIGN PATENT DOCUMENTS

| | | | |
|---|---|---|---|
| 1062654 | 4/1954 | France | 60/39.15 |
| 1198873 | 12/1959 | France . | |
| 2099644 | 3/1972 | France . | |
| 0732981 | 3/1943 | Germany | 60/39.15 |
| 0296444 | 2/1954 | Switzerland | 60/39.15 |
| 478688 | 1/1938 | United Kingdom . | |
| 0605080 | 7/1948 | United Kingdom | 60/39.15 |
| 722230 | 1/1955 | United Kingdom . | |

*Primary Examiner*—Richard A. Bertsch
*Assistant Examiner*—Howard R. Richman
*Attorney, Agent, or Firm*—Lyon & Lyon

[57] ABSTRACT

A system and method are described for transferring excess air from the compressor of a combustion-gas turbine having a paired compressor and expander, to at least one separate combustor where it is mixed with fuel and burned to power at least one non-paired expander. In a preferred embodiment, the non-paired expander is an "off the shelf" unit which can be readily purchased and installed.

2 Claims, 1 Drawing Sheet

PROCESS AND ECONOMIC USE OF EXCESS COMPRESSED AIR WHEN FIRING LOW BTU GAS IN A COMBUSTION GAS TURBINE

This application is a continuation of U.S. Pat. No. 07/801,535, filed Dec. 2, 1991, now abandoned.

BACKGROUND OF THE INVENTION

The present invention relates to the field of combustion-gas turbines.

Combustion gas turbines are well-known devices for powering electrical generators and other equipment. Combustion gas turbines typically have at least one compressor, one expander and at least one combustor. In the compressor, air is pressurized to mix with a fuel for burning. The air/fuel mixture is then burned in the combustor, and the hot flue gas from the combustor is used to drive the expander.

A range of fuels have been used in combustion gas turbines, including high and low caloric value fuels. High caloric value fuels are defined for purposes of this disclosure as fuels having a heating value of around 20,000–23,000 BTUs per pound. High caloric value fuels include natural gas, which has a caloric value of approximately 23,000 BTUs per pound. Low caloric value fuels are defined for purposes of this disclosure as fuels having a heating value of about 4,000 BTUs per pound or less. Low caloric value fuels include coke oven gas, coal gas, reformed petroleum product gas and blast furnace gas, the latter typically having a caloric value of approximately 1,150 BTUs per pound.

When burned without excess air, high caloric value fuels can burn at about 4,000° F. Temperatures of that order of magnitude, however, are too high for the materials used in today's expanders and would damage the expander. To overcome this problem, combustion gas turbines designed for use with high caloric value fuels typically employ excess compressed air to cool and avoid damage and/or destruction to the expander. In contrast, low caloric value fuels burn at only about 2,000° F. This falls within the temperature constraints of materials used in modern expanders, and excess compressed air is not required.

Under certain circumstances, it may be desirable to use a low caloric value fuel in a combustion gas turbine designed for high caloric value fuels. For example, price or availability differences among different fuels, or stricter atmospheric pollution standards may favor use of a low caloric value fuel. One of the problems caused by using low caloric value fuel in a combustion turbine designed to burn high caloric value fuels is that the design of the combustor requires far more compressed air than is needed to burn a low caloric value fuel. Since using excess air to burn low caloric value fuel would likely extinguish the flame, the excess compressed air must be disposed of to achieve proper functioning.

Several solutions to this problem have been devised. The simplest solution is to bleed the excess compressed air into the atmosphere. This solution is undesirable because the excess air contains considerable energy which would be wasted. Typical excess air may have a pressure of about 200 psig and a temperature of about 660° F. Venting of such high energy air into the atmosphere is extremely inefficient.

Other solutions presently being practiced use the excess air for miscellaneous mechanical purposes besides operation of the turbine. For example, some of the compressed air energy can be recovered in an air expander, which in turn provides power for a generator or other machinery. Alternatively, the residual compressed air can be used in various process applications. Steel plants are in operation which might use the residual compressed air as the "wind" in a blast furnace. Excess compressed air may also be used as feed to an oxygen plant in a gasification unit. However, some loss in efficiency will always be present because the amount, pressure and temperature of the excess air produced is unlikely to match exactly the process requirements for the excess air.

Another solution which has been proposed is to specifically design a compressor for use with a low caloric value fuel in combination with a standard, high caloric expander. This solution involves high design costs and lengthy delays, and results in a machine that would require major modification to burn alternate fuels.

Still another solution is to mix low caloric value fuels with one or more fuels having a higher caloric value. The mixed fuels may have a sufficient caloric value to operate an unmodified turbine without stalling. However, this solution is inherently inefficient because the turbine is not optimized to the air/fuel mixture being used.

SUMMARY OF THE INVENTION

In the present invention, excess air from one or more paired compressor/expander sets is transferred to a separate expander without a compressor, ("a non-paired expander"), where it is used in the combustor associated with the non-paired expander to burn additional fuel. In a preferred embodiment, the non-paired expander is an "off the shelf" unit which can be readily purchased and installed, and would only be operated to the extent that excess air from one or more of the paired compressor/expander sets is available.

The present invention has several advantages. One advantage is a reduction in the amount of fuel-energy required to produce a unit of power.. Another advantage is that 30% to 50% more power can be generated than if the excess air were used for miscellaneous other purposes. Another advantage is that it provides a means of optimizing turbine operation to accommodate whatever fuel is being used. If the caloric value of the fuel changes, the division of the air produced by the combustion-gas turbine compressor can be changed, directing more air to the paired expander when the caloric value goes up, or more air to the non-paired expander when the caloric value goes down. This also minimizes the capital cost of converting a plant from one fuel to another, and obviates the need to design new compressors or other equipment. Still other advantages include more efficient use of the excess air and elimination of the dependence of other equipment on the excess air which might or might not be produced by the combustion-gas turbines.

BRIEF DESCRIPTION OF THE DRAWINGS

These and other objects and advantages of the present invention will become better understood through a consideration of the following description taken in conjunction with the drawings in which.

DETAILED DESCRIPTION OF THE PREFERRED EMBODIMENT

Figure 1:
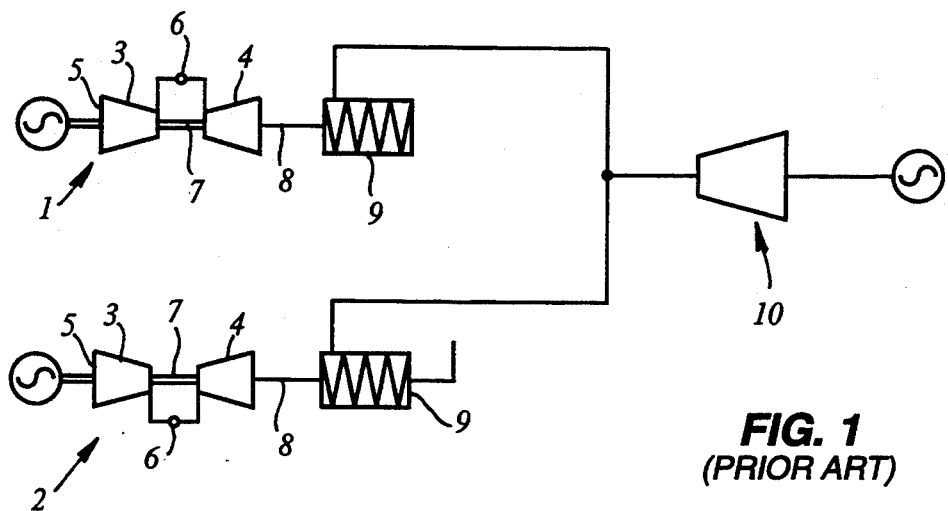
FIG. 1 is a schematic of a typical generating system using high caloric value fuel in combustion-gas turbines in a manner well known in the art.

Turning now to the drawings, FIG. 1 depicts a typical, electrical generating system of the prior art using high caloric value fuel in combustion-gas turbines ("CGT"). Two CGTs 1, 2, each have a compressor 3 paired with an expander 4. Air enters the paired compressors 3 at air inlet ports 5. Some of the compressed air is mixed with gaseous fuel in at least one combustor 6, where the air/fuel mixture is burned to produce hot flue gas. The hot flue gas enters the paired expanders 4 at hot flue gas inlet ports 7. The fuel line supplying the fuel is not shown. The exhaust from each paired expander 4 is fed via an exit duct 8 to a heat-recovery steam generator ("HRSG") 9, which in turn generates steam to drive a common steam turbine generator 10. The system depicted is known as a "Combined Cycle" system, and is well known in the art. A Combined Cycle system is about 50% thermally efficient when the hot flue gas entering the paired expanders 4 is at about 2,300 F. CGT and HRSG units can be employed singly or in combination depending upon the power requirements of the system.

With current technology, a given compressor is almost always paired with a given expander to burn fuels having a particular range of caloric values. Compressors used in conjunction with high caloric value fuels are designed to produce sufficient compressed air to burn the fuel, and also to produce "excess" compressed air to reduce the temperature of the flue gas and sometimes to cool the expander. Compressors used in conjunction with low caloric value fuels are designed to produce only sufficient compressed air to burn the fuel.

One of the problems arising from use of a low calorie fuel in a turbine designed to burn a high calorie fuel is that the compressor will continue to produce excess compressed air, but the excess is no longer needed to cool the turbine. Unless the excess air is extracted from the compressor, it will enter the expander and may result in stalling or inefficient burning of the fuel, or overloading of the expansion turbine. One solution known to the art is extraction of the excess air for miscellaneous mechanical and/or process uses. In a typical configuration depicted in FIG. 2, which has been employed previously, the paired compressor/expander of a Combined Cycle generating system have been modified for use with low caloric value fuel by transferring some of the compressed air produced by the compressors 3 via a transfer line 15 to miscellaneous other process or mechanical users (not shown).

Figure 2:
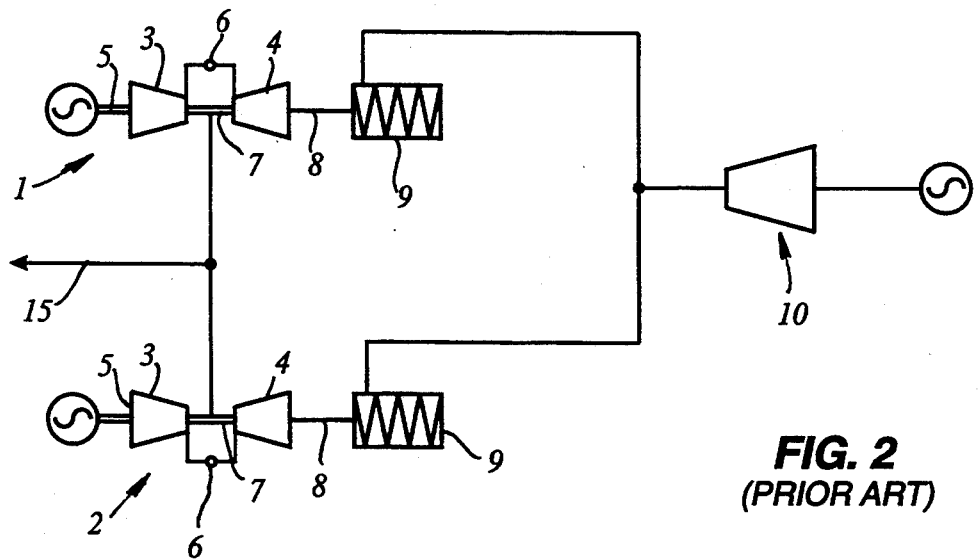
FIG. 2 is a schematic of the generating system of FIG. 1 modified to use low caloric gas.

The solution depicted in FIG. 2 suffers from several drawbacks. For example, the amount of excess air extracted from the compressors 3 may vary greatly since it depends on the extent to which low caloric value fuel is being burned. The process or mechanical users would therefore have an unreliable source of compressed air. Also, it may be inefficient and/or impractical to transfer the excess air to process or mechanical users which may be situated at a relatively great distance from the turbines.

Figure 3:
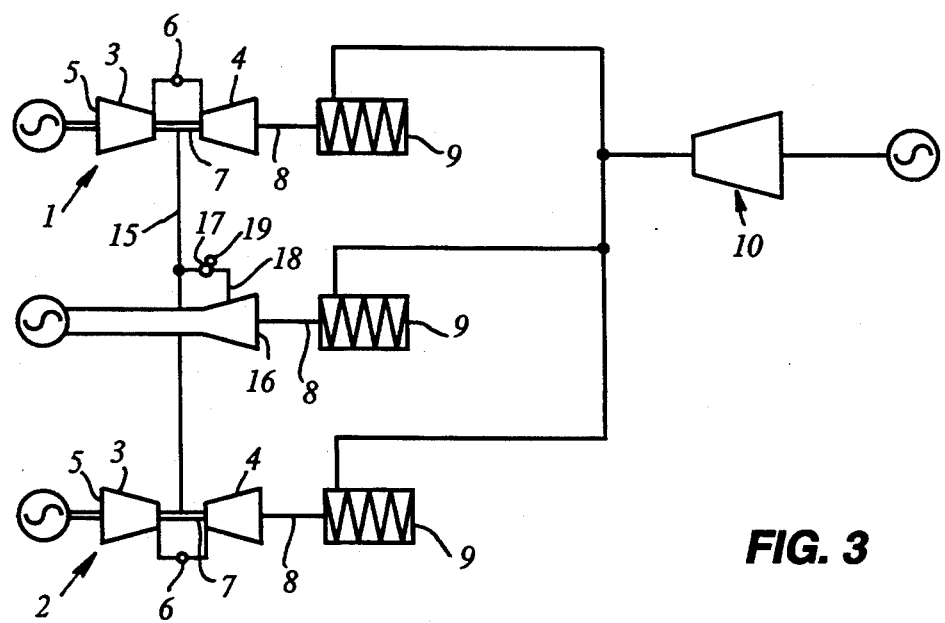
FIG. 3 is a schematic of a combustion gas turbine generator modified to transfer excess air from two paired compressor/expander units to a non-paired expander in accord with the present invention.

FIG. 3 depicts a preferred embodiment of the present invention which resolves the problems associated with the excess compressed air in a new manner. In FIG. 3, a transfer line 15 carries excess air from two paired compressors 3 to the combustor 17 of a non-paired expander 16. The excess air is first combined with fuel and burned in combustor 17, and the resulting hot flue gas enters the non-paired expander 16 at an inlet port 18. Although this embodiment uses two paired compressors to produce excess air for a single, non-paired expander, one could utilize a greater or lesser number of paired compressors and a greater or lesser number of non-paired expanders.

Several examples have been calculated which show the increased efficiency arising from employment of the present invention. The examples are summarized in the chart below. Of course, these examples are for illustrative purposes only, and are not meant to limit the scope of the claimed subject matter.

CHART

| EXAMPLE NO. | 1 | 2 | 3 | 4 | 5 |
|---|---|---|---|---|---|
| CGT IDENTIFICATION NO. | V84.3 | V84.2 | V84.2 | W501D5 | W501D |
| Base Case (FIG. 2) kW | 422,000 | 342,000 | 342,000 | 400,000 | 400,000 |
| Excess Air Available, when firing BFG to the paired machines, lbs/hr | 1,608,130 | 1,215,720 | 1,215,720 | 632,880 | 632,880 |
| The Invention (FIG. 3) | | | | | |
| Extra Fuel Employed | | | | | |
| MMBtu/hr | 562 | 458 | 577 | 224 | 310 |
| Natural Gas, lbs/hr | 26,928 | 21,951 | 7,647 | 10,725 | 0 |
| BFG, lbs/hr | 0 | 0 | 352,608 | 0 | 261,605 |
| Hot Gas Flow to non-paired expander, lbs/hr | 1,635,000 | 1,238,000 | 1,576,000 | 634,600 | 895,000 |
| Additional Power generated in non-paired expander, kw | 127,000 | 96,000 | 116,000 | 50,000 | 65,000 |
| Heat avail for HRSG MMBtu/hr | 315.83 | 239.73 | 302.41 | 124.38 | 170.55 |
| Additional power generated in Steam Turbine, kW | 34,000 | 26,000 | 33,000 | 13,500 | 18,500 |
| Increase in power produced, kW | 161,000 | 122,000 | 149,000 | 63,500 | 83,500 |
| Total Power Produced, kW | 583,000 | 464,000 | 491,000 | 463,500 | 483,500 |

The improvement attributable to the Invention is shown by the Btu Required per kWh:

| | -continued | | | | |
|---|---|---|---|---|---|
| | CHART | | | | |
| EXAMPLE NO. | 1 | 2 | 3 | 4 | 5 |
| CGT IDENTIFICATION NO. | V84.3 | V84.2 | V84.2 | W501D5 | W501D |
| The Invention | 7,192 | 7,716 | 7,534 | 7,689 | 7,550 |
| Base Case | 8,605 | 9,130 | 9,130 | 8,350 | 8,350 |

The first example, depicted in the column marked "1" in the chart, relates to the use of a V84.3 combustion gas turbine manufactured by Siemens. Utilizing the configuration of FIG. 2, the CGT would produce 422,000 kilo Watts (kW) and 1,608,130 lbs/hr of excess air. The average efficiency, as defined by expenditure of heat to produce a kilowatt of power, is 8,605 Btu/kW. Utilizing the configuration of FIG. 3, and employing natural gas as the additional fuel, the corresponding efficiency is calculated to be 7,192 Btu/kW, an improvement of approximately 16.4%.

The second and third examples, depicted in the columns marked "2" and "3" respectively, use the V84.2 combustion gas turbine manufactured by Siemens. The base case, again using the configuration of FIG. 2, produces power with an efficiency of 9,130 BTU/kW. The second example, employing natural gas as the additional fuel in the configuration of FIG. 3, results in a corresponding efficiency of 7,716 BTU/kW. The third example, employing a combination of natural gas and blast furnace gas as the additional fuel in the configuration of FIG. 3, results in a corresponding efficiency of 7,534 BTU/kW. This corresponds to a calculated improvement in efficiency of 15.5% and 17.5% respectively.

The fourth example, depicted in the column marked "4" uses the W501D5 combustion gas turbine manufactured by Westinghouse. The base case, using the configuration of FIG. 2, produces power with an efficiency of 8,350 BTU/kW. Utilizing the configuration of FIG. 3, and employing natural gas as the additional fuel, the corresponding efficiency is raised to 7,689 Btu/kW, a calculated improvement of approximately 7.9%.

The fifth example, depicted in the column marked "5", also uses the W501D combustion gas turbine manufactured by Westinghouse. The base case, using the configuration of FIG. 2, produces power with an efficiency of 8,350 BTU/kW. Utilizing the configuration of FIG. 3, and employing blast furnace gas as the additional fuel, the corresponding efficiency is raised to 7,550 Btu/kW, a calculated improvement of approximately 8.4%.

Various other and further embodiments of the present invention may be practiced without departing from the spirit and scope of this disclosure. For example, with respect to FIG. 3, the transfer line 15 could incorporate a bleed valve for bleeding the excess air to the atmosphere or a transfer valve for transferring it to miscellaneous mechanical and process users. As used in the claims, transferred air refers to excess air that is transferred to a non-paired expander. As another example, an automatic fuel control mechanism 19 could be used to adjust the amount of fuel being mixed with the transferred air to the amount of excess air being extracted from the paired compressors 3.

What is claimed is:

1. A method of adapting a power generating system having a combustion-gas turbine to use a low caloric value fuel instead of a high caloric value fuel, the system including a compressor and at least one expander matched such that the compressor is designed to produce only that amount of compressed air estimated to meet the process requirement of the expander when operating with a high caloric value fuel, the method comprising:

burning a low caloric value fuel in conjunction with said turbine in such manner as to produce excess compressed air beyond the process requirements of the matched expander, extracting said excess compressed air from the combustion-gas turbine;

transferring at least some of the excess air extracted from the compressor to a non-matched expander; and adding fuel to the transferred air and combusting the fuel to power the non-matched expander.

2. A method of using low caloric value fuel to power a combustion-gas turbine having a matched compressor and expander configured to use high caloric value fuel, the matched compressor designed to produce only that amount of compressed air estimated to meet the process requirements of the matched expander when operating with the high caloric value fuel, the method comprising:

supplying the low caloric value fuel to the combustion-gas turbine;

extracting a sufficient amount of excess air from the matched compressor to maintain the temperature of the hot flue gas entering the matched expander;

providing a non-matched expander;

transferring at least some of the excess air extracted from the matched compressor to the non-matched expander; and adding fuel to the transferred air and combusting said fuel to power the non-matched expander.

* * * * *